May 24, 1955  E. F. BRITTEN III  2,708,819
EDGING GUIDE FOR GRASS TRIMMERS

Filed March 23, 1954

INVENTOR.
Edwin F. Britten III,
BY
George D. Richards
Attorney

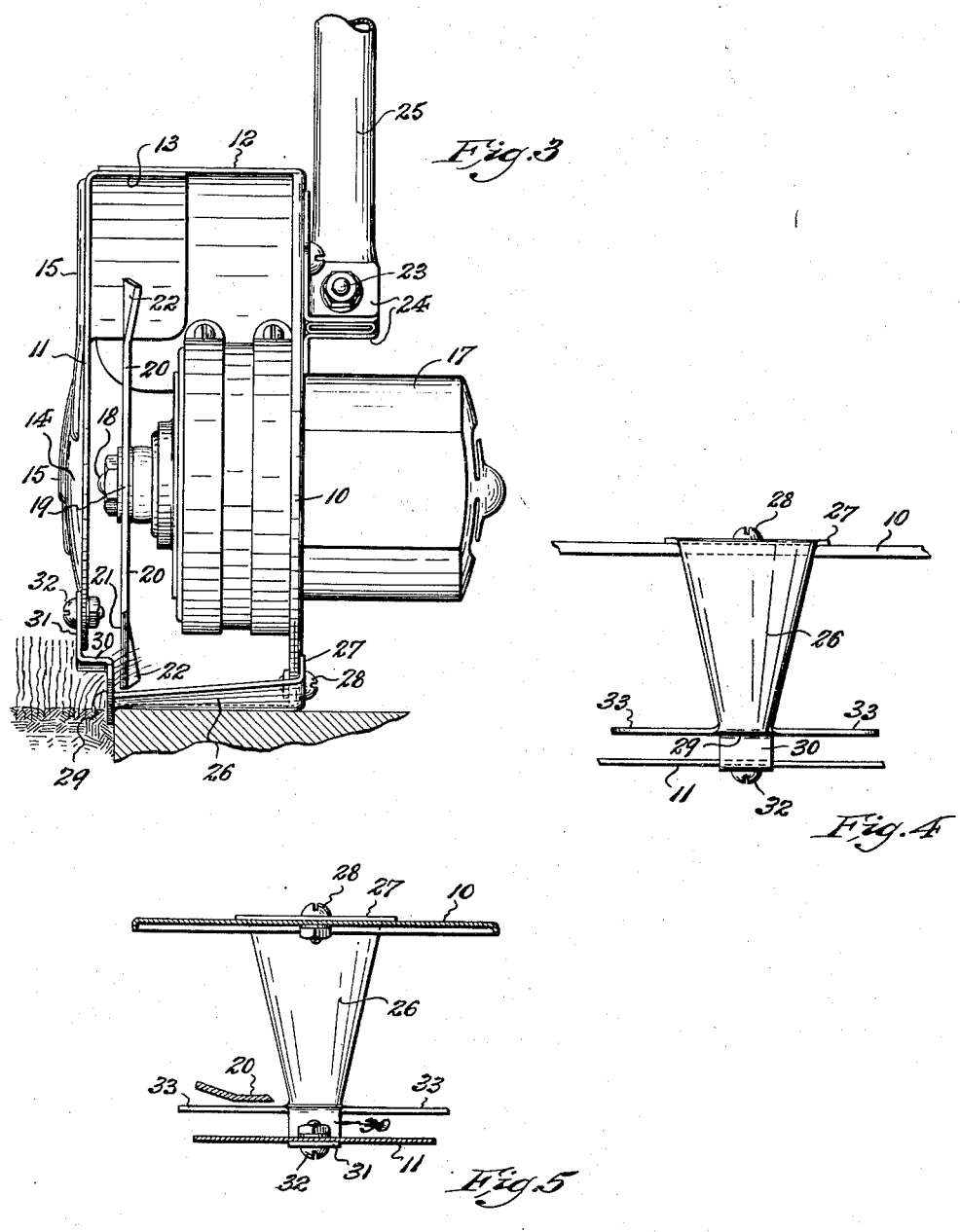

2,708,819

EDGING GUIDE FOR GRASS TRIMMERS

Edwin F. Britten III, Short Hills, N. J.

Application March 23, 1954, Serial No. 418,126

2 Claims. (Cl. 56—25.4)

This invention relates to improvements in grass trimmers, such as used for trimming grass adjacent to walls and curbs, around trees and monuments, and in other areas which are not accessible to ordinary lawn mower devices.

This invention has for an object to provide an improved edging guide for a grass trimmer, whereby to facilitate use of the grass trimmer for edging borders of lawns, especially such borders as extend contiguous to paved walks, driveways, curbs and to flower beds.

The invention has for a further object to provide an improved edging guide comprising a main body disposed to bridge across the front or forward end portion of the carriage frame of the grass trimmer in extension between the top plate and the bottom or skid plate thereof, in rigidly affixed relation thereto, thus being adapted to serve both as a skid shoe for support of the grass trimmer when the latter is perpendicularly disposed and thus positioned for edging operation, and as a cutting blade guard; said body being provided with a grass hook for cooperation with the rotary cutting blade of the grass trimmer, and for guiding the movement of the grass trimmer during edging operation thereof.

The above and other objects will be understood from a reading of the following detailed description of the invention in connection with the accompanying drawings, in which:

Fig. 3 is an end elevational view of the same, viewed from the right in Fig. 2. Fig. 4 is a fragmentary end elevational view, viewed in the direction of the arrow X in Fig. 1, and Fig. 5 is a horizontal sectional view, taken on line 5—5 in Fig. 2.

Figure 1:
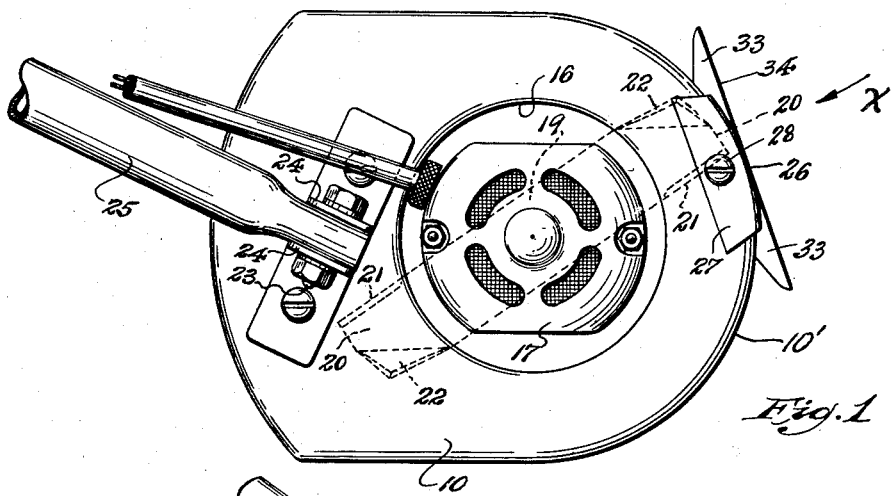
Fig. 1 is a top plan view of a grass trimmer equipped with the novel edging guide according to this invention.

Referring to the drawings, in which corresponding parts are indicated by the same reference numerals, the carriage frame of the grass trimmer comprises a top plate 10 and a bottom or skid plate 11 disposed in axial alignment with said top plate in downwardly spaced relation thereto. The top plate and the bottom or skid plate can be connected together by any suitable means. As shown, by way of illustration, the top plate 10 is provided at its rear end with a dependent back flange 12, and the bottom or skid plate is provided with an upstanding back flange 13 which laps the back flange 12 of the top plate, and which is fixedly secured to the latter in any suitable manner. The bottom or skid plate 11 is suitably shape so as to be reenforced against deformation; such reenforcement may comprise a central concavo-convex section 14, and, if desired, may additionally include a plurality of longitudinally extending, laterally spaced apart ribs or runners 15.

The top plate 10 is constructed to support a power unit by which the cutting blade of the grass trimmer is actuated. To this end, said top plate is provided with a centrally located, upwardly open well portion 16 dependent therefrom in which the power unit is mounted. As shown, the power unit comprises an electric motor 17. The armature shaft 18 of said motor 17 projects from the bottom of the well portion 16 toward the inner face of the bottom or skid plate 11 of the carriage frame. Suitably fixed on the projecting portion of the motor armature shaft 18 is the cutting blade of the grass trimmer. In a preferred form thereof, said cutting blade comprises a transversely extending blade body 19 disposed in a plane parallel and adjacent to the inner face of the bottom or skid plate 11 of the carriage frame. The blade body 19 provides oppositely extending blade arms 20, the end portions of which each terminate in sharpened cutting edge portions 21 disposed to extend along the leading side margin thereof, and in upward, angularly pitched fan sections 22 disposed to extend along the trailing side margin thereof.

The radius of the top plate 10 exceeds the radial extent of the cutting blade arms 20, so that the periphery of said top plate serves as a fending guard to prevent the cutting blade from contacting walls, curbs, monument bases or the like along which the grass trimmer may be moved in use.

The bottom or skid plate 11 is of a radius less than the radial extent of the cutting blade arms 20, so that the effective cutting edge portions 21 of the latter project exteriorly beyond the periphery of said bottom or skid plate, whereby to make mowing contact with grass over which the grass trimmer is moved in use.

Pivotally connected with the rear end portion of the top plate 10 by a pivotal connection 23, which is supported by and between bearing members 24 fixed on the top surface of said top plate, at the back or rearward end portion thereof, is a handle shaft 25 by which the grass trimmer can be manipulated in use.

The edging guide is connected to extend between the forward end portion of the top plate 10 and the forward end portion of the bottom or skid plate 11, so as to bridge the space between these parts of the carriage frame in a plane substantially perpendicular to the planes thereof and to that of the cutting blade 19. Said edging guide comprises a main body 26 having at its top plate engaging end an angular flange 27 which laps the top plate, and which is secured to the latter by a fastening bolt 28, or by any other suitable fastening means. Said main body 26 is preferably of tapering width toward the bottom of skid plate 11, and terminates in a grass hook section 29, transversely disposed at a substantially right angle to said main body so as to project inwardly therefrom in a plane parallel to and intermediate the planes of the cutting blade 19 and the bottom or skid plate 11, and so as to lie exteriorly of but closely adjacent to the plane of said cutting blade. Integral with and extending angularly outward from the inner or upper margin of said grass hook section 29 is a coupling extension 30 which terminates in an angular ear or lug 31 disposed to lap the bottom of skid plate 11, and which is secured to the latter by a fastening bolt 32, or by any other suitable fastening means. The grass hook section 29 is formed to provide oppositely extending hook arms 33. Said grass hook section, including its oppositely extending hook arms, is provided with a straight bottom or outer edge 34 which is disposed in a plane substantially tangent to the periphery or edge 10' of the top plate 10 and to the main body 26 of the edging guide. Each hook arm 33 is provided with an upwardly and inwardly inclined top or inner edge 35 which extends to a side edge of the coupling extension 30.

Although the grass trimmer has been shown as equipped with an electric motor as the power unit for driving the cutting glade 19, it will nevertheless be understood that any other suitable type of power unit may be utilized.

Figure 2:
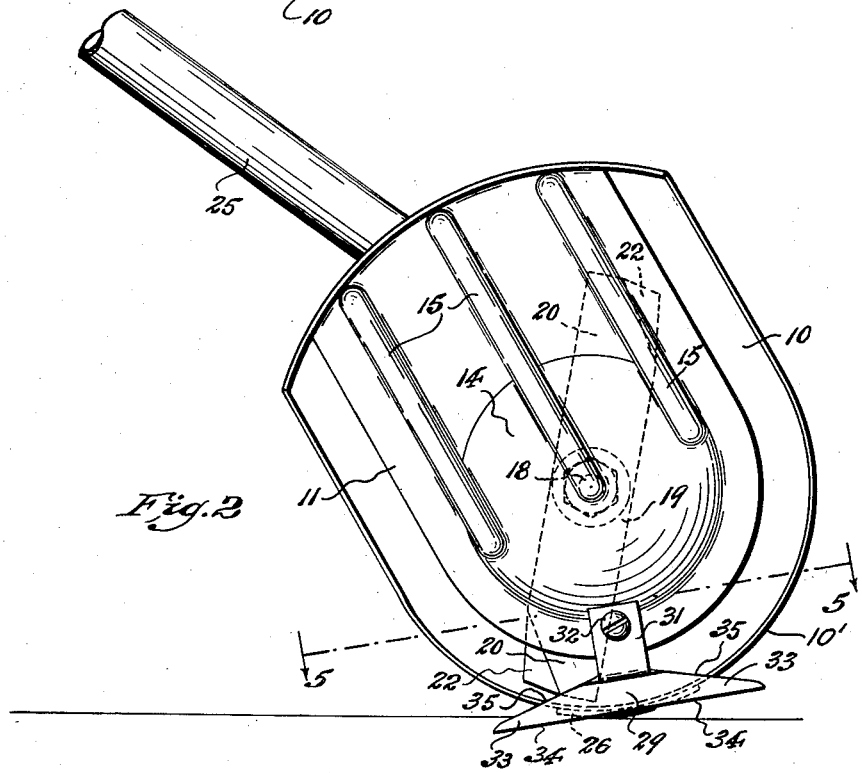
Fig. 2 is a bottom plan view of the grass trimmer, showing the same and the edging guide as positioned for edging operation.

To manipulate the grass trimmer for use thereof in performance of an edging operation, the handle shaft 25 is swung about its pivotal support to extend from the carriage frame in a plane parallel to the plane of the carriage frame and the rotary cutting blade 19. To edge a grass border, e. g. along the margin of a paved walk, curb or driveway, the carriage frame is turned from its normal horizontal position to a perpendicular position, and is thus disposed to upstand on edge, so that the cutting blade 19 will rotate substantially perpendicular to the horizontal plane of the pavement. With the carriage frame thus positioned, the same, under the control of the handle shaft 25, is tilted so that the main body 26 of the edging guide will engage the surface of the pavement, and thus serve as a skid shoe in support of the carriage frame, and in such relation to the pavement that a grass hook arm 33 will be downwardly inclined to intersect the plane of the pavement surface in such position as to abut and ride against the margin of the pavement (see Figs. 2 and 3), whereby to guide the grass trimmer as it is drawn along the marginal portion of the pavement.

In performing the edging operation, the power unit being operative to drive the cutting blade 19, as the guided grass trimmer is drawn along the marginal portion of the pavement, any grass contiguous to and overhanging the pavement margin will be engaged by the downwardly inclined advancing grass hook arm 33, so as to be lifted by the upwardly and rearwardly inclined top edge 35 thereof into the path of the rotating blade arms 20 of the cutting blade, whereby to be trimmed off thereby (see Fig. 3).

Due to its construction and its rigidly attached bridging extension to and between the top plate 10 and the bottom or skid plate 11 of the carriage frame, the edging guide, by its main body 26, not only serves as a skid shoe in support of the carriage frame, so that the grass trimmer can be retained by the user in edgewise upstanding operative position with minimum effort, but said edging guide also serves to fend the rotating cutting blade arms 20 from any possible damaging contact with the pavement, and also additionally serves to brace the bottom or skid plate 11 in resistance to possible deformation by accidental blows and inward displacement thereof involving risk of shifting a grass hook arm 33 into the path of rotation of the cutting blade arms 20, with likelihood of resultant damage to either or both thereof. Since the main body 26 of the edging guide serves as a skid shoe when the grass trimmer is used for an edging operation, it therefore prevents wear or injurious deformation of the periphery or edge 10' of the top plate 10, by which the carrier frame would otherwise have to be supported.

It will be understood that the grass trimmer can be operated for ordinary grass trimming performance when supporting the same by its bottom or skid plate 11 in normal horizontal plane. Owing to the angularly offset position of the edging guide relative to the longitudinal axis of the carriage frame (as shown), the presence of the edging guide will not unduly interfere with such ordinary grass trimming operation. The edging guide may therefore be permanently attached to the carriage frame. However, if it is desirable, the edging guide may be removed under such circumstances, since (as shown) it may be attached to the carriage frame by releasable fastening means.

Having now described my invention, I claim:

1. In combination with a grass trimmer having a carriage frame comprising a top plate and a bottom skid plate with a power driven rotary cutting blade intermediate to the same, an edging guide comprising a main body disposed to bridge across the forward end portion of the carriage frame between the top plate and bottom skid plate thereof, means to attach one end portion of said main body to the top plate, means to attach the opposite end portion of said main body to the bottom skid plate, whereby said main body is adapted to serve as a skid shoe in support of the carriage frame when the latter is perpendicularly disposed to perform an edging operation, and said main body being provided, inwardly of its attachment to the bottom skid plate, with a grass hook means disposed in a plane adjacent and parallel to the rotary cutting blade, whereby to deflect grass to be trimmed into the path of rotation of the latter, the bottom margin of said grass hook means extending in a plane tangent to the edge of the carriage frame top plate, whereby to project outwardly beyond the edge of the latter for service as means to engage a pavement margin and thus guide the carriage frame during an edging operation of the grass trimmer.

2. In combination with a grass trimmer having a carriage frame comprising a top plate and a bottom skid plate with a power driven rotary cutting blade intermediate the same, an edging guide disposed to bridge across the forward end portion of the carriage frame, whereby a portion thereof serves as a skid shoe in support of the carriage frame when the latter is perpendicularly disposed to perform an edging operation, said edging guide comprising a main body having means to attach one end thereof to the carriage frame top plate, said main body being provided with a transverse combined grass hook and guide means disposed in a plane parallel to and intermediate the planes of said bottom skid plate and rotary cutting blade, the outer edge of said combined grass hook and guide means extending in a plane perpendicular to the plane of said main body, and coupling means extending from the inner edge of said combined grass hook and guide means in outwardly offset relation thereto, and means to attach said coupling means to the carriage frame bottom skid plate.

References Cited in the file of this patent

UNITED STATES PATENTS

| | | |
|---|---|---|
| 2,612,741 | McKay | Oct. 7, 1952 |
| 2,653,381 | Rooke | Sept. 29, 1953 |
| 2,660,847 | Britten III | Dec. 1, 1953 |
| 2,672,002 | Nelson | Mar. 16, 1954 |